L. D. LEWIS.
APPARATUS FOR PRESERVING MILK.
APPLICATION FILED FEB. 24, 1910.
964,983.
Patented July 19, 1910.
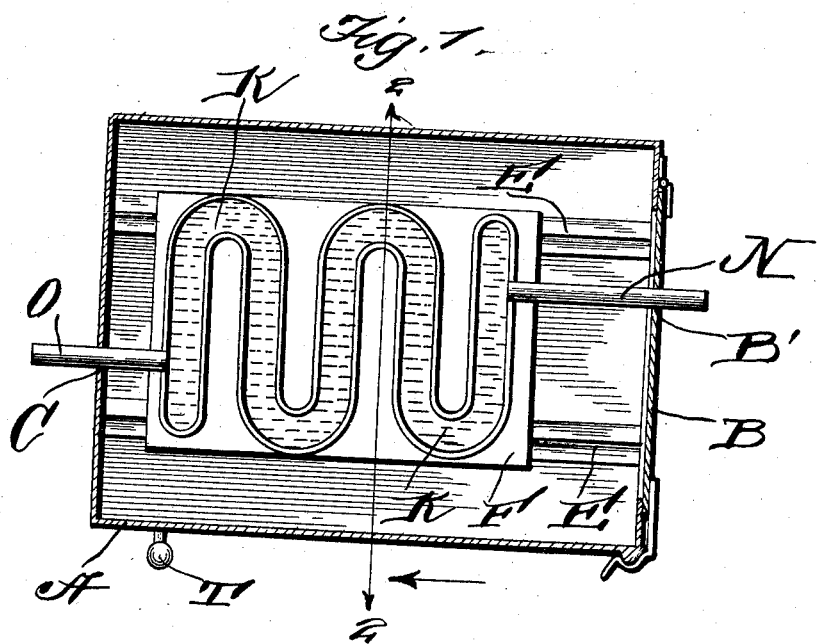
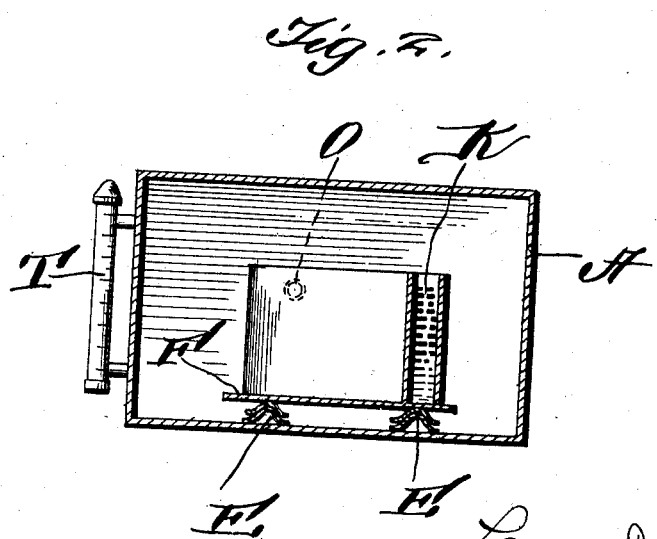

UNITED STATES PATENT OFFICE.

LORENZO D. LEWIS, OF ADAMS, NEW YORK.

APPARATUS FOR PRESERVING MILK.

964,983.  Specification of Letters Patent.  Patented July 19, 1910.

Application filed February 24, 1910. Serial No. 545,609.

*To all whom it may concern:*

Be it known that I, LORENZO D. LEWIS, a citizen of the United States, residing at Adams, in the county of Jefferson and State of New York, have invented certain new and useful Improvements in Apparatus for Preserving Milk; and I do hereby declare the following to be a full, clear, and exact description of the invention, such as will enable others skilled in the art to which it appertains to make and use the same, reference being had to the accompanying drawings, and to the letters and figures of reference marked thereon, which from a part of this specification.

This invention relates to new and useful improvements in apparatus for preserving milk and comprises means for passing the milk through an open worm contained within a vulcanizer, the temperature of which is raised to a high degree, sufficient to heat the milk to proper temperature to destroy any bacteria in the milk as it courses through the open worm, thus producing a pure milk which may be kept, suitable for use, for a considerable length of time.

My invention is illustrated in the accompanying drawings, in which:—

Figure 1 is a transverse sectional view through a vulcanizer, showing in top plan the open worm passageway through which the milk is adapted to course, and Fig. 2 is a cross sectional view at right angles to the plane shown in Fig. 1.

Reference now being had to the details of the drawings by letter, A designates a vulcanizer which may be of any size or shape and is provided with a door B at one end which is apertured at B' and the opposite end apertured at C. Rising from the upper surface of the bottom of the vulcanizer are the ribs E parallel to each other and arranged lengthwise in the vulcanizer.

F designates a plate having inverted V-shaped guide members projecting from the bottom thereof and parallel to each other and adapted to rest upon said ribs to which they conform in shape and forming means whereby the plate may be guided in its longitudinal movements. Upon the upper surface of said plate is an open worm-shape passageway K, closed at its ends, and N is a pipe leading into one end of said passageway adjacent to its lowest portion, and O an exit pipe leading from the opposite end of the worm adjacent to its highest portion. Said pipe N passes through said door B of the vulcanizer and through which milk to be treated is adapted to flow into the open worm passageway. The other pipe O leads through the opposite end of the vulcanizer and forms an exit passageway. A suitable thermometer T is placed upon the vulcanizer and so arranged that the temperature of the interior of the vulcanizer may be indicated so that the proper degree of heat may be maintained for obtaining best results in the treatment of the milk.

In operation, the plate with the open worm passageway is inserted within the vulcanizer and heat, preferably ranging from 200° to 600° Fahrenheit, is generated in any suitable manner within the vulcanizer and, as the milk courses through the open worm passageway, it should pass with sufficient speed in order to heat the same from 130° minimum to 225° maximum and which will be sufficient to destroy any bacteria within the milk and so act upon the milk that it will keep pure and sweet for a considerable length of time. The milk treated in this way will become slightly thickened, holding the cream in the milk in solution without separation.

What I claim to be new is:—

An apparatus for preserving milk comprising a vulcanizer having an opening at one end, ribs rising from the upper surface of the bottom of the vulcanizer, a plate, grooved strips fastened parallel to each other to the under surface of said plate and resting upon and guided by said ribs as the plate is moved longitudinally, a liquid containing worm passageway rising from said plate, and pipes communicating with said passageway adjacent to its ends and extending through the ends of the vulcanizer.

In testimony whereof I hereunto affix my signature in the presence of two witnesses.

LORENZO D. LEWIS.

Witnesses:
HENRY O. KENYON,
CHARLES H. KENYON.